F. J. BOWMAN.
DUST COLLECTOR.
APPLICATION FILED APR. 18, 1914.
1,235,535.
Patented July 31, 1917.
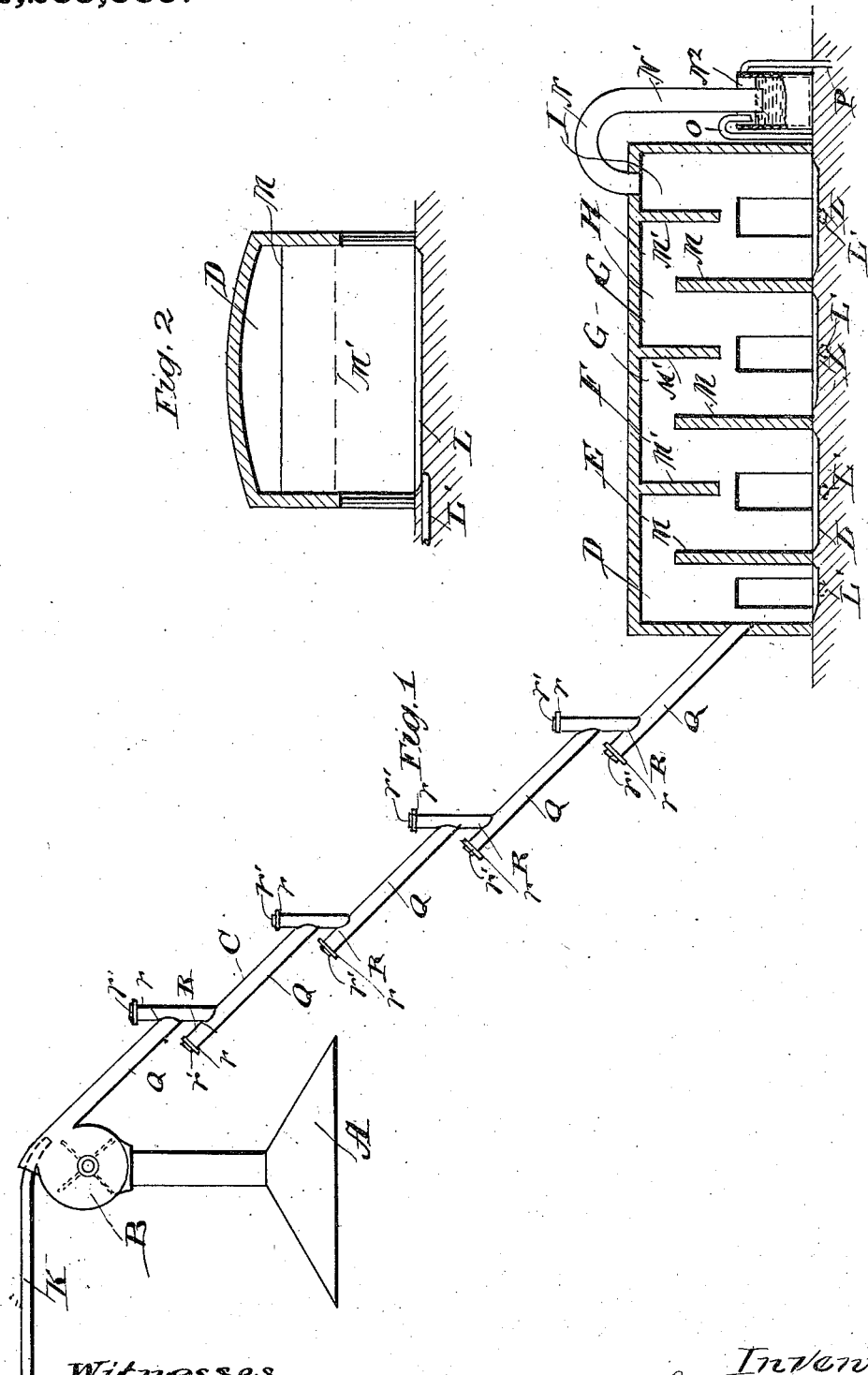

UNITED STATES PATENT OFFICE.

FREDERICK JOSEPH BOWMAN, OF CLEVELAND, OHIO.

DUST-COLLECTOR.

1,235,535.   Specification of Letters Patent.   Patented July 31, 1917.

Application filed April 18, 1914. Serial No. 832,994.

*To all whom it may concern:*

Be it known that I, FREDERICK J. BOWMAN, a citizen of the United States, and resident of Cleveland, in the county of Cuyahoga and State of Ohio, have invented certain new and useful Improvements in Dust-Collectors, of which I hereby declare the following to be a full, clear, and exact description, such as will enable others skilled in the art to which it appertains to make and use the same.

The objects of the invention are to provide a collecting device for the dust produced in grinding or other machinery in which pulverized ores, coal, malt, and farinaceous and other materials are treated, and in which great quantities of dust are produced, which are dissipated and lost, and which in the case of mineral substances enter the working parts and journal bearings of the machinery and lessen their efficiency and quickly wear them out.

The collecting device described also serves to recover gases and gaseous by-products of all sorts which would otherwise be wasted, and it is especially adapted to collect and deposit noxious fumes and gases of all sorts before any injurious effects can be produced thereby.

To accomplish this result the dust or gas is first absorbed by means of a vapor such as exhaust steam and is propelled through suitable conduits into a suitable series of collecting chambers where the vapor is condensed and the dust is deposited upon the walls of said chambers, and gas and gaseous products are removed with the liquid produced by condensation.

The results obtained eliminate all gases and fumes, and deposit every particle of dust, and prevent all waste.

This process is especially valuable where valuable ores are ground and all the dust and residue are valuable.

It is also valuable in collecting gaseous by-products of all sorts.

The invention is exemplified in the accompanying drawings, and is hereinafter more fully described, and specifically pointed out in the claims.

In the accompanying drawings Figure 1 is a vertical longitudinal section of an apparatus constructed and arranged to accomplish the desired results; Fig. 2 is a transverse section thereof through the settling tank.

In these views A is a hood which can be placed over an ore pulverizing or other grinding machine or over a dust or gas producing device of any kind.

B is a fan or blower which quickly draws the dust or gaseous products from the hood and forces them into and through a conduit C which is preferably inclined downwardly and terminates in the first of a series of collecting chambers D, E, F and G through which the products described are carried by the current produced by the blower.

The products when received in the conduit are subjected to a current of moist air or vapor such as exhaust steam at the point of condensation, which is conveyed thereto through a pipe K preferably closely adjacent to the blower which injects the vapor into the conduit longitudinally thereof.

The current of vapor charged with the products described passes downward through the conduit and enters the first chamber D where a portion of the vapor is condensed upon the walls thereof and the dust is deposited upon the walls while the condensed vapor in a fluid form runs down the walls and collects upon the floor in a basin L prepared therefor.

A certain amount of dust will also be collected upon the floor or basin and the surplus moisture will find its exit through a conduit L' to any convenient well or receptacle therefor.

The temperature of the series of chambers is lower than the temperature of the vapor and they are substantially alike but are separated by vertical baffle plates M, M, M', M', which are spaced apart and preferably overlap at their adjoining edges as shown in Fig. 1, so as to check the passage of the dust laden vapor and give it an alternately upward and downward direction, thus assisting in producing the condensation thereof upon the cold walls.

The moistened dust will be immediately discharged from the air which carries it as the vapor is condensed and will collect upon the walls and bottom and any gas or gaseous products will be absorbed by and carried away in the fluid deposit. Each chamber is provided with a settling basin L for dust from which the liquid escapes through a conduit L' as described for the first chamber.

The air freed from vapor passes upward through a conduit N and thence downward at N' into a settling tank N² where the last vestige of dust is deposited and also any remaining gas or vapor is absorbed.

The water in the tank N² is preferably kept running by means of a hydrant O and overflow pipe P.

The conduit C is preferably formed of vitrified pipe having smooth inner surfaces adapted to assist in the movement of the moistened masses passing therethrough.

The moisture formed by condensation of the vapor upon these surfaces will assist the current by its weight in washing the dust out of the conduit. This conduit is usually constructed of straight sections Q and spaced Y's R so connected as to present extremities $r$ through which the operator can have access to the interior to clean the pipe when any collection of material threatens to choke the conduit. These extremities are tightly closed by heads $r'$, $r'$ when the conduit is in use.

By means of the devices and method described no vestige of dust or gaseous products of any kind will remain in the current of air which issues from the tank and no dust or gas will remain in the vicinity of the machine, everything of this character being deposited in the collecting chambers of which any desired number may be used.

The vapor used can be drawn from the exhaust of a steam engine or from the exhaust of a drier and may contain dust or may be obtained from any convenient source The functions of the vertical portions of the Y's R, R, of the conduit C are to provide baffles in the conduit which serve to check and turn over the moist vapor and dust particles so as to thoroughly commingle them together and the general inclination of the conduit insures a thorough cleansing of every part and delivery of all the dust at the bottom in the form of mud or slime.

This construction adapts the device for general use in collecting all possible forms of dust such as dust from grinding machines, furnaces, hydrated lime, cement plates, pulverized coal and wherever there is an excess of dust.

Any kind of moist vapor such as exhaust steam not under pressure or vapor derived from drying moist materials or other waste vapors can be usefully employed.

A distinct advantage found in the use of vapor not under pressure is that an excessive use is not a detriment but rather a benefit, but in the processes requiring the measured use of steam under pressure an excess is productive of damage and is detrimental to the product and apparatus.

The dust when coming in contact with the walls absorbs the moisture and becomes heavy, and therefore is deposited immediately when coming in contact with any damp surface, and hence a large proportion of the dust is deposited in the inclined conduit.

The conduit as constructed presents walls at various angles and the blower propelling the dust and vapor thoroughly mixes them, and drives them against the walls, where the moisture is condensed.

Having described the invention what I claim as new and desire to secure by Letters Patent is:

1. In a dust collector, the combination of dust propelling means, a separating chamber, and a downwardly extending conduit connecting at its upper end with said propelling means and at its lower end with said separating chamber, said conduit consisting of a plurality of alternately arranged vertical and inclined sections, each of such sections extending rearwardly beyond its connection to the next adjacent section and being provided at such extending end with a removable closure.

2. In a dust collector, the combination of a fan adapted to propel dust, a downwardly directed steam jet disposed tangentially with respect to said fan, a casing inclosing said fan and jet, said casing being arranged to permit the steam from said jet and the column of dust from said fan to converge, a downwardly extending conduit extending from said casing, said conduit consisting of alternately arranged vertical and inclined sections, such inclined sections being disposed in parallelism and at an angle of approximately 45 degrees to the vertical.

In testimony whereof I hereunto set my hand this 31" day of Mch 1914.

FREDERICK JOSEPH BOWMAN.

In presence of—
WM. M. MONROE,
CHAS. H. OLDS.